(12) United States Patent
Shinozaki et al.

(10) Patent No.: US 6,993,220 B2
(45) Date of Patent: Jan. 31, 2006

(54) TEMPERATURE-COMPENSATED OPTICAL FIBER COMPONENT

(75) Inventors: Atsushi Shinozaki, Tokyo (JP); Shigehito Yodo, Tokyo (JP); Toshihiko Ota, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 47 days.

(21) Appl. No.: 10/176,472

(22) Filed: Jun. 19, 2002

(65) Prior Publication Data

US 2003/0007751 A1    Jan. 9, 2003

(30) Foreign Application Priority Data

Jun. 20, 2001  (JP) .............................. 2001-186864
Jun. 21, 2001  (JP) .............................. 2001-188189

(51) Int. Cl.
*G02B 6/34*    (2006.01)

(52) U.S. Cl. .............................. 385/37; 385/92; 385/99
(58) Field of Classification Search .................. 385/37
See application file for complete search history.

(56) References Cited

U.S. PATENT DOCUMENTS

| | | | |
|---|---|---|---|
| 6,430,350 B1 * | 8/2002 | Bookbinder et al. | 385/136 |
| 6,453,092 B1 * | 9/2002 | Trentelman | 385/37 |
| 6,563,970 B1 * | 5/2003 | Bohnert et al. | 385/13 |
| 6,603,900 B1 * | 8/2003 | Bookbinder et al. | 385/37 |

FOREIGN PATENT DOCUMENTS

| | | |
|---|---|---|
| JP | 10-096827 | 4/1998 |
| JP | 2000-347047 | 12/2000 |

* cited by examiner

*Primary Examiner*—John R. Lee
*Assistant Examiner*—Phillip A. Johnston
(74) *Attorney, Agent, or Firm*—Knobbe, Martens, Olson & Bear, LLP

(57) ABSTRACT

A temperature-compensated optical fiber component for use in high-density WDM optical communication includes an optical fiber which has a Bragg grating serving as a monochromatic filter, an inner package which supports the optical fiber and causes the Bragg grating to have a temperature-compensating capability, and an outer package arranged outside the inner package. A clearance having a heat insulating function is provided between the outer package and the inner package.

20 Claims, 3 Drawing Sheets

TEMPERATURE-COMPENSATED OPTICAL FIBER COMPONENT

BACKGROUND OF THE INVENTION

1. Field of the Invention

This invention relates to an optical fiber component used in the field of optical communications, and more particularly to a temperature-compensated optical fiber component, suitably used in a WDM (Wavelength Division Multiplexing) communication system.

2. Description of the Related Art

Conventionally, a temperature-compensated optical fiber component is known which has an optical fiber grating as part of an optical fiber.

At the optical fiber grating, the effective refractive index of a core of the optical fiber is periodically changed along the axis of the optical fiber. The optical fiber grating is used for reflecting a light having a relatively narrow wavelength range which is called a Bragg reflection wavelength as a center wavelength. The Bragg reflection wavelength is determined by a Bragg grating period and the effective refractive index of the fiber core. Here, the Bragg reflection wavelength $\lambda$, the effective refractive index n, and the Bragg grating period $\Lambda$ have the relationship expressed by the following equation (1):

$$\lambda = 2n\Lambda \tag{1}$$

For this reason, the optical fiber grating is usually referred to as the Bragg grating, and employed in the WDM communication system as a single-wavelength filter excellent in selecting a specific wavelength. However, the Bragg reflection wavelength $\lambda$ has temperature dependency in respect of both of the effective refractive index n of the fiber core and the Bragg grating period $\Lambda$, as shown in the equation (1). Therefore, the temperature-compensated optical fiber component which employs a temperature-compensating package, as means for compensating or suppressing the temperature dependency of the optical fiber grating, is proposed.

Temperature-compensated optical fiber components have been proposed, for example, in Japanese Unexamined Patent Publication (Kokai) No. Hei 10-96827, and Japanese Unexamined Patent Publication (Kokai) No. 2000-347047. According to them, to enable temperature compensation of the above optical fiber components, a member having a negative coefficient of linear expansion is used. Alternatively, a combination of two kinds of members having different coefficients of linear expansion are used. More specifically, the optical fiber having a tension applied thereto beforehand is fixed or bonded to the above member(s), for example, by an organic adhesive, by which a negative temperature dependency is imparted to the Bragg grating period $\Lambda$ of the Bragg grating. The negative temperature dependency of the Bragg grating period $\Lambda$ is canceled by the positive temperature dependency of the effective refractive index n of the fiber core, which enabling the temperature compensation of the optical fiber component. As a result, the temperature dependency of the Bragg reflection wavelength $\lambda$ is compensated for, whereby a stable monochromatic filter for use in the WDM communication system can be obtained.

However, the aforementioned temperature-compensating mechanism cannot effectively work if an external force is applied to the optical fiber component to deform a fiber-supporting portion, or the optical fiber component is used under circumstances where it is partially heated, or the predetermined tension applied to the optical fiber is changed with the lapse of time.

OBJECT AND SUMMARY OF THE INVENTION

It is an object of the present invention to provide a temperature-compensated optical fiber component so as to preserve its desired optical quality even if an external force is applied thereto, or its environmental temperature may rapidly change, or there is a heat source in its vicinity, or even after it is used over a long period of time.

According to the present invention, an optical fiber component comprises an optical fiber, an inner package connected to the optical fiber, the inner package having a portion for processing a light transmitted through the optical fiber, and outputting the processed light, cover means for covering the inner package and permitting the optical fiber to be guided out of the optical fiber component, the cover means including an outer package surrounding an outside of the inner package in a circumferential direction, and heat insulating means for reducing heat transfer between the outer package and the inner package.

According to this component, the outer package prevents the inner package from being deformed by an external force, such a deformation deteriorating the accuracy of the Bragg grating. The heat insulating means protects rapid heat transfer to the inner package from outside owing to a change of an environmental temperature, and prevents the inner package from having a temperature gradient even though there is a heat source in its vicinity. More specifically, when the processing portion is a Bragg grating formed on the optical fiber, the outer package prevents a change in the tension of the Bragg grating caused by the deformation of the inner package. The heat insulating means can include an air layer or a heat insulating member provided between the inner package and the outer package, which enhancing heat insulation from the outside to preserve the thermal uniformity of the inner package.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the invention herein described.

Figure 1:
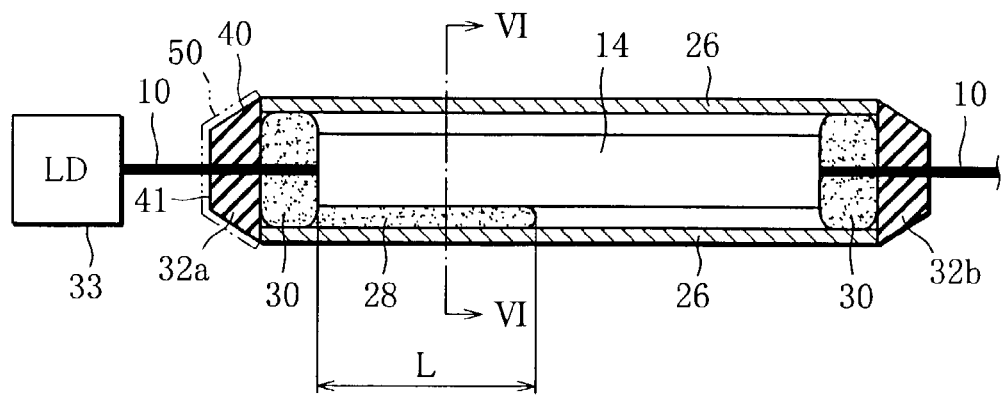
FIG. 1 is a diagram schematically showing a temperature-compensated optical fiber component, according to an embodiment of the present invention.
Figure 2:
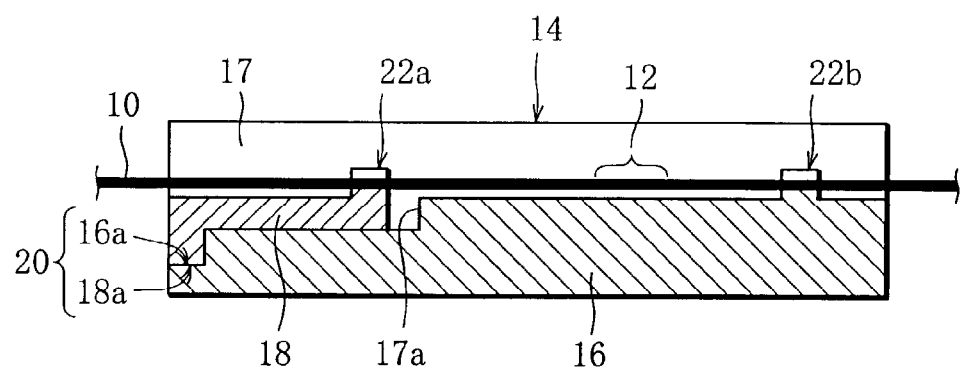
FIG. 2 is a cross-sectional view showing a temperature-compensating package of FIG. 1.

FIG. 1 shows a temperature-compensated optical fiber component according to an embodiment of the invention. The optical fiber component includes a temperature-compensating package 14, and an optical fiber 10 extending through the package 14. As shown in FIG. 2, a Bragg grating 12 is formed on the optical fiber 10, where the effective refractive index n is periodically changed longitudinally.

Further, the package 14 includes a base 16 in the form of a hollow cylinder having an outer diameter of 4.8 mm. The base 16 is formed with a groove 17 which extends along the axis of the base 16 from one end portion to the other end portion thereof, and the optical fiber 10 extends through the groove 17. A rack 18 is arranged in the groove 17. More specifically, the groove 17 has one end portion formed deeper than the remaining portion thereof, and the rack 18 is accommodated in the one end portion, with a desired distance between the rack 18 and an opposed step surface 17a of the groove 17. The base 16 is formed of invar 36FN (registered trade mark) having a small coefficient of linear expansion, while the rack 18 is formed of aluminum (Al) having a large coefficient of linear expansion. Further, the base 16 and the rack 18 are fixed to each other at one end of the groove 17 by a bonding portion 20. The bonding portion 20 includes a projection 18a formed on one end portion of the rack 18, and a recess 16a formed in one end portion of the groove 17. The rack 18 is fixed to the base 16 by fitting the projection 18a into the recess 16a. That is, the rack 18 is fixed to the base 16 only by the projection 18a, and the other surfaces of the base 16 and the rack 18 are not fixed to each other. Consequently, the base 16 and the rack 18 are substantially in contact with each other and hence they are permitted to thermally expand and contract independently of each other due to a change of environmental temperature.

Optical fiber bonding projections 22a and 22b (bonding portions 22) are formed at a free end of the rack 18 and the other end portion of the base 16, respectively. The optical fiber 10 is fixed to the bonding projections 22a and 22b by using adhesives 23a and 23b. Therefore, the optical fiber 10 is in a state of floating from the bottom of the groove 17 and the rack 18. The above Bragg grating 12 is positioned between the bonding projections 22a and 22b.

Figure 3:
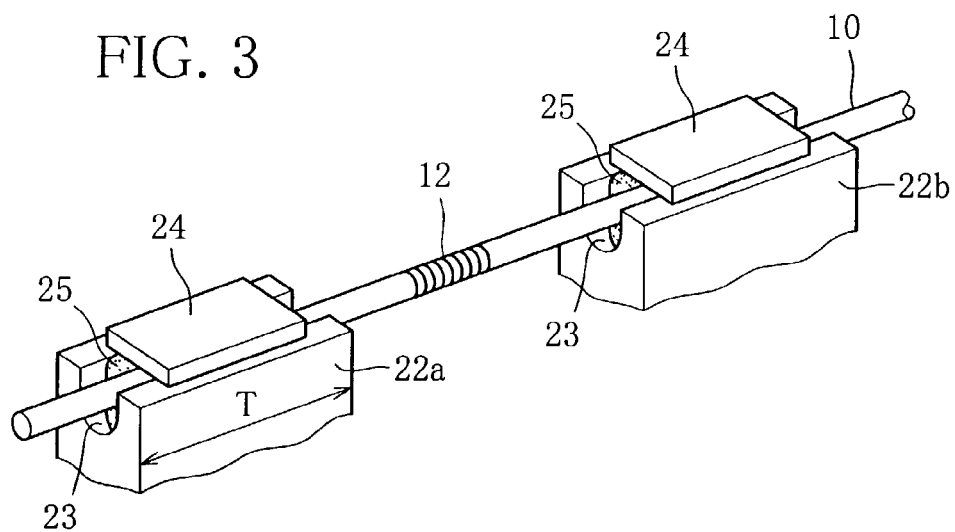
FIG. 3 is a perspective view showing an optical fiber bonding portion.
Figure 4:
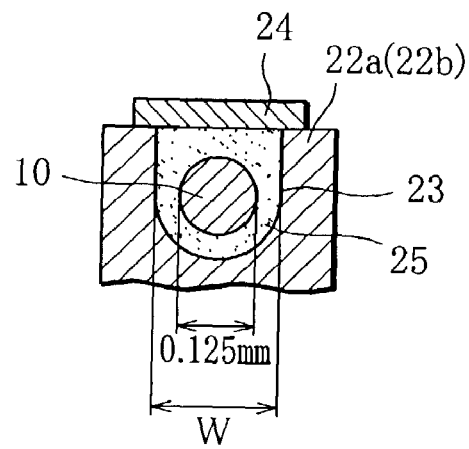
FIG. 4 is a cross-sectional view of the bonding portion FIG. 3.

FIGS. 3 and 4 show details of the optical fiber bonding portions 22 (bonding projections 22a and 22b).

Each of the optical fiber bonding portions 22 has an inserting groove 23 formed in the top thereof. The inserting groove 23 has a U-shaped cross-section. The optical fiber 10 extends through the center of the inserting groove 23. The groove 23 is covered by a lid 24 which is arranged on the top of the bonding portion 22.

An adhesive 25 is filled between the inner walls of the inserting groove 23 and the lid 24, and the optical fiber 10. That means the adhesive 25 joins the bonding portion 22 and the optical fiber 10 as well as the bonding portion 22 and the lid 24.

As clearly shown in FIG. 4, the adhesive 25 has a thickness defined by a gap between the inner wall surface of the inserting groove 23 and the peripheral surface of the optical fiber 10. The thickness of the adhesive 25 is uniform along the circumference of the optical fiber 10, and set to be equal to or smaller than 0.1 mm. More specifically, assuming that the optical fiber 10 has an outer diameter of 0.125 mm, for instance, the inserting groove 23 is configured to have a width W of 0.325 mm or less and a depth of 0.325 mm or less. In addition, the inserting groove 23 has a bottom which has a curvature radius of W/2 or less. If the inserting groove 23 is configured to have the width, depth and bottom of such sizes, and the adhesive 25 is filled around the optical fiber 10 positioned at the center of the inserting groove 23, the thickness of the adhesive 25 filled between the optical fiber 10 and the inner walls of the inserting groove 23 is set to be equal to or smaller than 0.1 mm.

Further, preferably, the inserting groove 23 has a length T of at least 2.2 mm or more.

Figure 5:
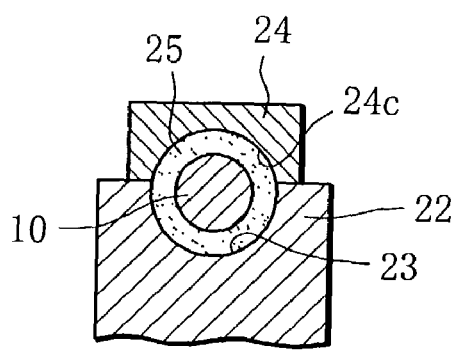
FIG. 5 is a diagram showing a modification of the optical fiber bonding portion.

The inserting groove 23 is not limited to a U-shaped one. As shown in FIG. 5, it may have a semicircular cross-section. In the case of the inserting groove 23 having such a cross-section, the lid 24 may be formed with an arcuate groove 24c in the under surface thereof. In this case, both of the inserting groove 23 and the arcuate groove 24c have a curvature radius of W/2 or less.

With such a bonding portion 22, the optical fiber 10 is positioned on the axis of a circular inserting path defined by the inserting groove 23 and the arcuate groove 24c, and the inserting path is filled with the adhesive 25. Thus, the adhesive 25, filled as described above, can have a thickness of 0.1 mm or less along the whole circumference of the optical fiber 10.

When the optical fiber 10 is fixed to the bonding projections 22a and 22b, it is important to apply a predetermined tensile stress to the Bragg grating 12 in advance. More specifically, a tension necessary for canceling the temperature dependency of the Bragg reflection wavelength $\lambda$, as aforementioned, within a temperature range (e.g. from $-20°$ C. to $85°$ C.) of an environment in which the temperature-compensating optical fiber component is used, must be applied to the Bragg grating 12 beforehand.

In the following, a mechanism of the package 14 which compensates suppresses the temperature dependency of the Bragg reflection wavelength $\lambda$ will be described in detail.

Now, assume that the environmental temperature is changed, and the temperatures of the base 16, the rack 18, and the Bragg grating 12 are raised by the same degree. In this case, both of the base 16 and the rack 18 are thermally expanded independently, and as a result, the distance between the bonding projections 22a and 22b becomes shorter owing to a difference of the coefficients of linear expansion between the base 16 and the rack 18, reducing the tension applied to the Bragg grating 12. Therefore, the Bragg grating period $\Lambda$ is shortened to be imparted with a negative temperature dependency. On the other hand, the effective refractive index n of the core of the optical fiber 10 at the Bragg grating 12 has a positive temperature dependency. Consequently, the negative temperature dependency and the positive temperature dependency cancel each other to compensate for the temperature dependency of the Bragg reflection wavelength $\lambda$ as a whole. As far as the temperature of the package 14 is in the range of the environmental temperature described hereinabove, a change in the Bragg reflection wavelength $\lambda$ is allowable within limits.

However, although the package 14 has the above temperature-compensating mechanism, if the tension applied to the optical fiber 10 is changed with the lapse of time, that is, the negative temperature dependency of the Bragg grating period $\Lambda$ becomes inaccurate, it is impossible for the intended temperature compensation to be executed correctly.

Therefore, intensive study of causes of the inaccuracy or the change in the tension applied has been done. It is finally found that a faulty fixing or bonding of the optical fiber 10 to the bonding projections 22a and 22b is one of the causes responsible for the change in the tension of the optical fiber 10 with the lapse of time. More specifically, unless the adhesive 25 has a uniform thickness, curing of the adhesive 25 does not proceed uniformly, thereby making it impossible to accurately give a desired tension to the optical fiber 10. Further, when the adhesive 25 has an excessively large thickness, the intended or required bonding force thereof is lowered, so that the tension of the optical fiber 10 is liable to be changed with the lapse of time.

In the case of the present invention, however, as described hereinbefore, the adhesive 25 for bonding the optical fiber 10 and the bonding portion 22 has a uniform thickness between the inner wall of the inserting groove 23 and the optical fiber 10, and furthermore the thickness is set to be equal to or smaller than 0.1 mm, i.e. very thin. Accordingly, when the optical fiber 10 is fixed to the bonding portions 22 as mentioned above, it is possible to avoid the faulty curing of the adhesive 25 and to hold a desired bonding force of the adhesive 25, thereby making it possible to accurately preserve the tension of the optical fiber 10 for a long period of time.

As shown in FIG. 1, the package 14 is surrounded by an outer package 26 with a uniform clearance of 0.10 to 0.25 mm therebetween, for example. The outer package 26 is formed of stainless steel pipe having an inner diameter of 5.1 mm. A silicone resin 28 is locally filled between the base 16 of the package 14 and the package 26, as a securing member. The silicone resin 28 secures the packages 14 and 26 to each other, and keeps the clearance therebetween uniform, having the intended bonding force.

Figure 6:
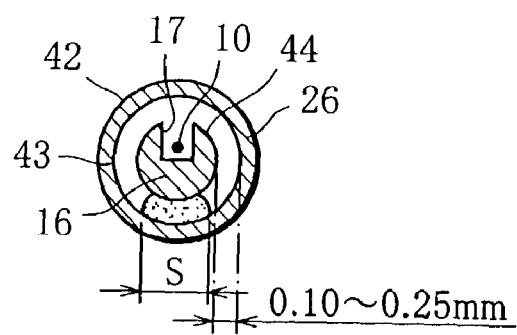
FIG. 6 is a sectional view taken along the line VI—VI of FIG. 1.

More specifically, the resin 28 is filled between one end portion of the base 16 and the outer package 26, and positioned such that the resin 28 and the groove 17 are at diametrically opposite locations, as shown in FIG. 6. This location of the resin 28 allows the base 16 to have freedom of thermal expansion and contraction along the axis of the optical fiber 10 on one hand, and prevents the resin 28 from intruding into the groove 17 of the base 16 on the other hand. Intrusion of the resin 28 into the groove 17 is not desirable since it rigidly fixes the base 16 and the rack 18 to each other, impairing the temperature-compensating capability of the optical fiber component. The above-mentioned local filling of the resin 28 between the base 16 and the package 26 has an advantage in that it simplifies and facilitates the manufacturing process of the optical fiber component. The length L over which the resin 28 is filled is shown in FIG. 1.

According to experiments, if the Young's modulus of the resin 28 is within a range of 0.8 to 2.0 MPa, the resin 28 can keep the uniform clearance between the inner package 14 and the outer package 26, and furthermore can be used for a good shock absorber of the inner package 14. On the other hand, if the Young's modulus of the resin 28 is out of the above range, it is impossible for the resin 28 to effectively absorb a shock to the inner package 14 applied from outside.

Further, if a combination of materials of the package 26 and the base 16 are properly chosen in view of a difference of the coefficients of thermal expansion between the outer package 26 and the base 16, the resin 28 can be filled between the lower portion of the base 16 and the package 26 along the full length of the base 16. When the base 16 is formed of titanium and the outer package 26 is formed of stainless steel, for instance, the coefficients of thermal expansion of the outer package 26 and the base 16 are about $8 \times 10^{-6}/°$ C. and $11 \times 10^{-6}/°$ C. (at an ordinary temperature or therearound), respectively, so that the difference of the coefficients of thermal expansion between outer package 26 and the base 16 is relatively small. Accordingly, the thermal distortion of the resin 28 is suppressed to small amount, even if the resin 28 is filled between the lower portion of the base 16 and the outer package 26 along the full length of the base 16, or locally filled between the lower portion of the base 16 and the package 26 from two opposite end portions(not shown).

On the other hand, the invar as a material of the base 16 has a coefficient of thermal expansion of approximately $1 \times 10^{-6}/°$ C. or less, and hence the difference of thermal expansion between the invar and the stainless steel as for the material of the outer package 26 is very large. Therefore, in this case, it is preferable to fill the resin 28 locally in a manner shown in FIG. 1. Of course, there occurs no thermal distortion of the resin 28 as long as the base 16 and the outer package 26 are formed of the same material. If the resin 28 is filled along the full length of the base 16, it is preferable to keep the constant clearance between the base 16 and the outer package 26. However, this has a disadvantage in that the quantity of the resin 28 may be increased in consumption.

Further, in the above embodiment, a silicone resin 30 for securing members is filled in opposite end portions of the outer package 26. The silicone resin 30 serves the function of securing the package 14 to the outer package 26. Moreover, rubber caps 32 are attached to the opposite end portions of the outer package 26, and press the opposite end portions of the inner package 14 via the resin 30.

As shown in FIG. 1, there is arranged a laser diode (LD) 33 in the vicinity of one rubber cap 32a. If the optical fiber 10 is optically connected to the LD 33, the optical fiber component is liable to be raised by heat from the LD 33. Therefore, it is preferred that the rubber cap 32a has an excellent heat resistance, and at the same time has a small thermal conductivity. Since the thermal conductivity of the rubber is approximately the same as that of the silicone resin, intrusion of heat from the LD 33 into the inner package 14 is effectively reduced so long as the rubber has a thickness of several millimeters or more.

Next, a method of manufacturing the above temperature-compensated optical fiber component will be described in detail.

First, as shown in FIG. 2, the optical fiber 10 including the Bragg grating 12 is attached to the package 14. More specifically, at an ordinary temperature, both portions of the optical fiber 10 on opposite sides of the Bragg grating 12 are fixed to the bonding projections 22a and 22b of the rack 18 and the base 16, respectively, by using epoxy adhesives 25, 25 of a UV curing type. The optical fiber 10 having the Bragg grating 12 between the above bonding portions 22 of the same, is being stretched. That is, a predetermined tension is provided to the Bragg grating 12. As the adhesives 25, a low-melting glass, a metal solder, a thermoplastic organic adhesive, and the like can also be suitably used.

Second, the inner package 14 is inserted into the outer package 26. Then, the silicone resin 28 is locally filled between the outer package 26 and the base 16 of the package 14 to keep the above-mentioned clearance. After then, the silicone resin 30 is filled in the opposite end portions of the outer package 26. After the package 14 has been fixed to the package 26, the rubber caps 32a and 32b are attached to the opposite end portions of the outer package 26, respectively.

The rubber caps 32a and 32b press the opposite end portions of the package 14 via the silicone resin 30.

As described above, the optical fiber component according to the present embodiment has a double package construction in which the inner package 14 is surrounded by the outer package 26, so that even if an external force is applied to the outer package 26, the force is protected to transmit to the inner package 14, which makes it possible to avoid deformations of the base 16 and the rack 18 supporting the optical fiber 10. As a result, the optical fiber 10 can keep the predetermined tension applied to the Bragg grating 12, thereby making it possible to obtain a desired Bragg reflection wavelength λ constantly.

The outer package 26 formed of stainless steel pipe has a relatively low thermal conductivity. Moreover, the clearance between the outer package 26 and the inner package 14 has a distance of 0.10 to 0.25 mm, and is filled by an air and the resin 28 both of which having low thermal conductivity. This clearance constructed above can suppress rapid heat transfer into the inner package 14 from outside due to a change of the environmental temperature.

Heat transmission between the inner package 14 and the outside in the direction orthogonal to the axial direction of the optical fiber 10 may be produced through two heat paths. One of the heat paths includes the air layer and the other includes the resin layer 28. Since the thermal conductivity of the air differs from that of the resin 28 by an order of magnitude, the quantity of heat transmitting through the resin layer 28 is comparable or smaller to that of the air layer so long as the resin-filling area is sufficiently smaller than the air-filling area.

According to experiments, when the base 16 was formed of titanium, there was no problem in the temperature-compensating performance of the inner package 14 on condition that a resin-filling area S was equal to or smaller than one-fourth of the whole circumference of the inner package 16, as viewed along the circumference of the inner package 14 in FIG. 6, and at the same time the resin-filling length L was within a range of 50% of the full length of the base 16.

Further, the outer package 26 may include a mirror-finished outer surface 42 and a mirror-finished inner surface 43. From a microscopic point of view, such surfaces 42 and 43 are very smooth. Therefore they can reflect radiant-heat effectively and can suppress the mutual transfer of the radiant-heat. Similarly, the base 16 as well can have a mirror-finished outer surface 44 to add radiant-heat reflecting properties thereof. Of course, a radiant-heat reflecting film 50 made of a material causing the same effect as those of the mirror-furnished surfaces 42 to 44 may be attached to the surface of the outer package 26 and/or the base 16. It is possible to deposit the radiant-heat reflecting film 50 on the surfaces of the rubber cap 32a and a rubber plug 34, both arranged in the vicinity of the LD 33, as indicated by two-dot chain lines in FIGS. 1, 7 and 8.

A fiber reinforced plastic (FRP) has a strength comparable to stainless steel, and at the same time has a thermal conductivity lower than that of stainless steel by one or more orders of magnitude. Therefore, as a variation, the outer package 26 may be formed by FRP.

Figure 7:
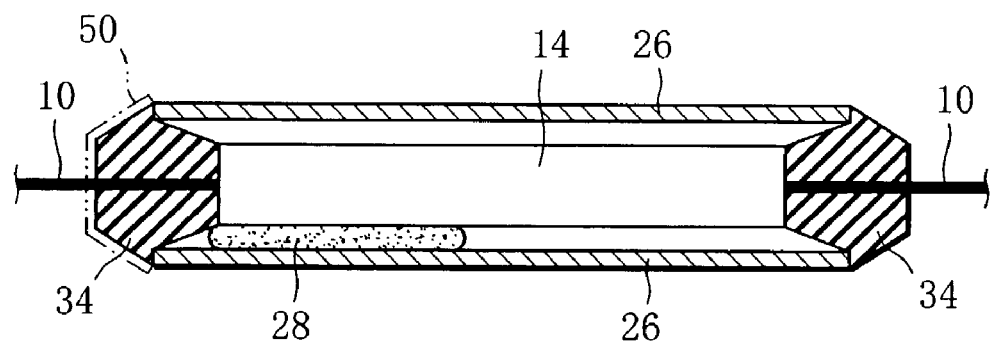
FIG. 7 is a diagram schematically showing a temperature-compensated optical fiber component according to another modification of the present invention.

In the above embodiment, the silicone resin 30 is filled in the opposite end portions of the outer package 26, so as to hold and secure the inner package 14 at a predetermined axial location within the outer package 26. But this is not limitative. That is to say, the silicone resin 30 may be dispensed with. As shown in FIG. 7, the rubber plugs 34 may be used in place of the rubber caps 32, for instance. Two rubber plugs 34 are fitted into the opposite end portions of the outer package 26, respectively, such that they directly press the opposite end portions of the inner package 14 to hold the same at the predetermined axial location.

Figure 8:
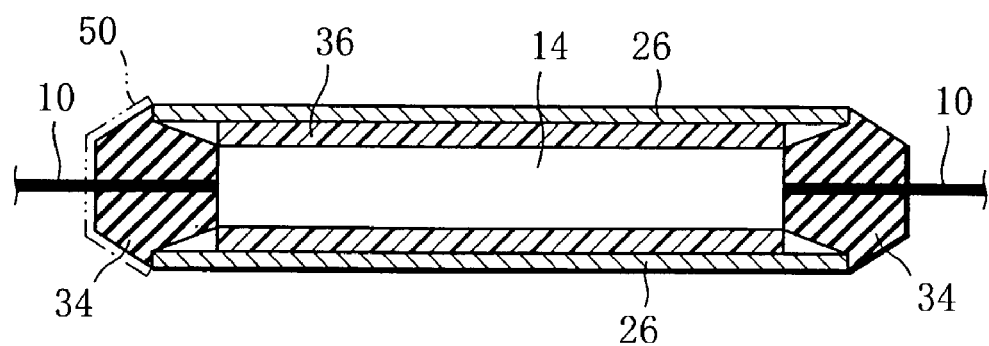
FIG. 8 is a diagram schematically showing a case in which a heat insulating member is inserted between an inner package and an outer package.

As shown in FIG. 8, a heat insulating effect can also be obtained by inserting a heat insulating member 36, such as a glass wool, a foamed sheet, or the like, which have approximately the same heat insulating property as that of the air, into the clearance between the inner and outer packages 14 and 26. In addition, the heat insulating member 36 can prevent any parts of the inner and outer packages 14 and 26 being brought into contact with each other.

The heat insulating member 36 is not only suitable for absorbing a shock from an external force but also contributes to keeping the clearance constant between the inner and outer packages 14 and 26 without the resin 28. This makes it easier to manufacture the optical fiber component.

In the above embodiment, a hybrid construction is employed for the temperature-compensating package 14 using two kinds of members having different coefficients of linear expansion, i.e. the base 16 made of the invar and the rack 18 made of Al are combined together. It is clear that the package 14 may be replaced by a package which has a hybrid construction using other kinds of members having the same characteristics as described above, or by a package using one kind of member having a negative coefficient of linear expansion.

The temperature-compensated optical fiber grating component according to the present invention, described heretofore, can provide the following advantageous effects:

According to the present invention, the inner package 14 which enabling the Bragg grating 12 of the optical fiber 10 to have the temperature-compensating capability, is surrounded by the outer package 26. Therefore, if it happens that an external force is applied to the outer package 26, the force transmitted to the inner package 14 is reduced by the outer package 26, which means to keep the predetermined tension of the Bragg grating 12 unchanged. Further, heat from the outside is prevented from directly transmitting to particular part of the inner package 14, thereby the package 14 can maintain its temperature-compensating mechanism properly. Furthermore, since the optical fiber 10 is fixed to the bonding projections 22a and 22b by using the adhesive 25 of a thin and uniform thickness, the tension of the optical fiber 10 continues to be stable for a long period of time. Therefore, a desired Bragg reflection wavelength λ with high accuracy can be always obtained by using the Bragg grating 12.

In addition, it is clear that the double package construction according to the present invention can be applied to other optical fiber modules, including an optical isolator, an optical circulator, and other optical fiber components.

What is claimed is:

1. An optical fiber component comprising:
an optical fiber including a Bragg grating formed on part of said optical fiber, said Bragg grating having a predetermined light-reflecting characteristic;
a temperature compensating device for suppressing temperature dependency of the light-reflecting characteristic of said Bragg grating, said compensation device including an outer periphery, a first base comprising first and second ends and configured to support said optical fiber by one supporting point located at said first end of said first base, said first base being extended along said optical fiber and having a bonding portion for fixing said optical fiber and said first base to each other at the supporting point, and a second base extending along said optical fiber from said second end of said first base beyond said first end of said first base and having said second end of said second base fixed to said second end of said first base in a state in which said first and second bases are permitted to thermally expand and contract independently of each other, said second base configured to support said optical fiber by another supporting point, said second base further having a coefficient of thermal expansion different from that of said first base, and having a bonding portion for fixing said optical fiber and said second base to each other at the another supporting point, said Bragg grating being positioned between the supporting points and having a predetermined tension applied thereto; and a covering device for covering said temperature compensating device and permitting said optical fiber to be guided out of said optical fiber component, said covering device including an outer package which has an inner peripheral surface surrounding said temperature compensating device, a heat insulating layer defined between the outer periphery of said temperature compensating device and the inner peripheral surface of said outer package, said heat insulating layer extending along a whole length of said temperature compensating device, and a support fitted into at least a part of said heat insulating layer, for supporting said temperature compensating device on the inner peripheral surface of said outer package.

2. The component according to claim 1, wherein said first base is disposed on said second base so that a gap is secured between the first end of said first base and a step formed on said second base, said gap allowing said first and second bases to thermally expand and contract independently of each other.

3. The component according to claim 2, wherein said first and second bases further comprise a projection and a recess formed on said second ends thereof, respectively, the projection being fitted into said recess.

4. The component according to claim 1, wherein the insulating layer includes an air clearance.

5. The component according to claim 4, wherein the support includes a fixing member interposed between said outer package and said temperature compensating device for keeping said air clearance.

6. The component according to claim 5, wherein said fixing member is formed of a silicone resin.

7. The component according to claim 1, wherein said heat insulating layer includes a heat insulating member for functioning as the heat insulating layer and the support.

8. The component according to claim 1, wherein said outer package is formed of stainless steel.

9. The component according to claim 1, wherein said outer package has opposite ends, and said heat insulating layer further includes heat insulating walls for closing the opposite ends of said outer package.

10. The component according to claim 9, wherein said heat insulating walls include outer surfaces toward an outside, and heat-reflecting films arranged on said outer surfaces, respectively.

11. The component according to claim 1, wherein each of said bonding portions of said bases includes an inserting groove for permitting said optical fiber to extend therethrough, and an adhesive layer filled between an inner wall surface of said inserting groove and said optical fiber, said adhesive layer having a uniform thickness.

12. The component according to claim 11, wherein said adhesive layer has a thickness of 0.1 mm or less.

13. The component according to claim 12, wherein said inserting groove has a length of 2.2 mm or more.

14. The component according to claim 12, wherein said each of said bonding portions further includes a lid for covering said inserting groove.

15. The component according to claim 14, wherein said inserting groove is U-shaped in cross section.

16. The component according to claim 14, wherein said inserting groove is semicircular in cross section, and said lid includes a circular groove for cooperating with said inserting groove to define a path circular in cross section.

17. The component according to claim 6, wherein the fixing member extends from one end of said temperature compensating device toward the other end thereof within a range of 50% of a full length of said temperature compensating device.

18. The component according to claim 17, wherein the fixing member and the bonding portions are positioned at the opposite locations of said inner package as viewed in a cross section thereof.

19. The component according to claim 18, wherein the fixing member has a width equal to or smaller than one-fourth of a whole circumference of said temperature compensating device.

20. The component according to claim 9, wherein each of said insulating walls has a rubber cap attached to the corresponding end of said outer package and a resinous filler filled between the rubber cap and said inner package.

* * * * *